Mar. 13, 1923.
G. M. CASTRUCCIO.
TREATING BRAZIL NUTS.
FILED JAN. 18, 1923.
1,448,520.
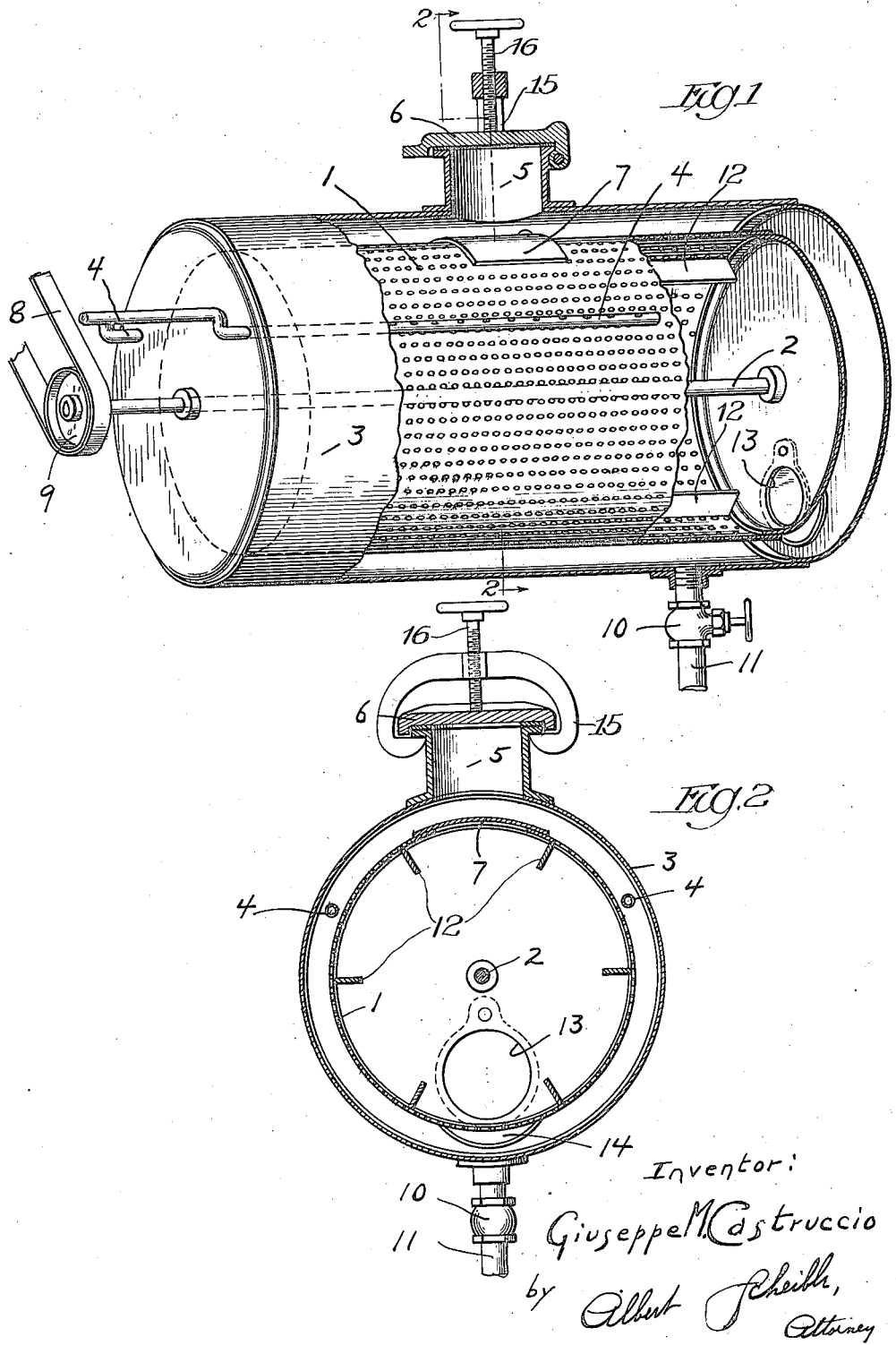
Inventor:
Giuseppe M. Castruccio
by Albert Scheible,
Attorney Patented Mar. 13, 1923.

1,448,520

UNITED STATES PATENT OFFICE.

GIUSEPPE M. CASTRUCCIO, OF CHICAGO, ILLINOIS, ASSIGNOR TO THE UNITED FIG & DATE COMPANY, A CORPORATION OF ILLINOIS.

TREATING BRAZIL NUTS.

Application filed January 18, 1923. Serial No. 613,384.

*To all whom it may concern:*

Be it known that I, GIUSEPPE M. CASTRUCCIO, a citizen of Italy, residing at Chicago, Illinois, have invented certain new and useful Improvements in Treating Brazil Nuts; and I do hereby declare the following to be a full, clear, and exact description of the invention, such as will enable others skilled in the art to which it appertains to make and use the same.

This invention has for its object to provide a simple, practical, inexpensive and expeditious process for producing blanched Brazil nut kernels. It has for its further object to provide a process whereby nuts in the shell, particularly Brazil nuts, are prepared for shelling so as to adapt them to be readily cracked and the kernels extracted therefrom in unbroken entities and entirely or partially blanched.

While the process may be advantageously applied to the preparation for cracking of edible nuts other than Brazil nuts, I have found it up to the present time to be most advantageous in the treatment of Brazil nuts and it will be understood that I do not wish to be limited to this particular type of nut, inasmuch as the process either in the identical form in which it is hereinafter described, or with some slight modifications, may be found to be equally advantageous in the preparation of other types of nuts for shelling with possible blanching effects being also produced.

Brazil nuts are peculiar and very difficult to crack and shell without breaking the kernels for the reason that the latter are originally relatively brittle, so snugly housed in the shell as to leave no room for applying cracking pressure to opposed walls of the nut without applying such pressure to and thereby breaking or injuring the kernel; and further there appears to be a very strong adhesion of the kernels to the shells so that in attempting to extract the meats from shell fragments after cracking, difficulty is experienced in effecting a separation of the kernel from the shell, it being found that in many instances the kernel is broken in the extraction because of this adhesion, which not only makes this shelling process expensive, but occasions great waste of shelled meats in that small particles of the kernel adhere to the shell and are discarded with the latter. Furthermore, when the kernels are extracted from the shells they are unblanched except as to a negligible proportion which is extracted in a partly blanched condition and the blanching of shelled meats is practically a peeling process which must be accomplished by hand at great expense. It is desirable, because of commercial value, to produce a practically blanched Brazil nut kernel possessing its original flavor and appearance, as such nut kernels bring a much higher price in the market than the unblanched kernels in entities or in pieces, and the completely blanched whole kernels bring a very much higher price than blanched pieces. The value commercially of a process which will not only facilitate cracking and shelling so as to avoid breaking or injuring the kernels, and which furthermore will effect a complete or partial blanching of all except a negligible portion of the kernels is, therefore, obviously of great value. It has been common practice to prepare Brazil nuts for cracking and shelling by first soaking them in hot water which being open to atmosphere cannot exceed 212° Fahr. for a period varying from half an hour for perfectly fresh moist nuts to an hour and a half for older and very dry nuts, and thereafter drying the nuts by subjecting the same to hot dry air for a period of about twenty-four hours before they may be cracked and the kernels extracted. While extraction is rendered easier and less breakage of kernels occurs because of this, the advantages accruing from the use of that process are very small. The shelled kernels are so moist that they must be dried by exposure to hot air for at least 24 hours before they may be packed and shipped or stored, for the reason that the excessive moisture will cause them to become moldy in a comparatively short time. This process deleteriously affects the flavor of the kernel and is therefore objectionable. The change in flavor appears to be due more or less to the fact that the kernels are possibly cooked or in a sense decomposed in the hot soaking process, and by this is meant that resulting effect on the kernels which causes their color to change from a light-cream white to a gelatinous translucency. Furthermore, no more of the kernels are obtained in a completely blanched condition than are obtained from the raw nuts and only a small percentage are obtained in a partially blanched condition.

Brazil nuts when fresh appear to contain from about eight to about ten per cent of their weight in natural moisture but by the time that they reach North American markets this moisture content approximates only five per cent. The kernels are then very brittle and in cracking the nuts the breakage of the kernels is practically unavoidable.

When moistened by immersion in water or subjection to vapor at a temperature considerably below the boiling point of water for a sufficient length of time, the nuts in the shell will absorb moisture until the moisture content of the kernel thereof is substantially eight to ten per cent of their weight. This amount of moisture in the kernel is, however, excessive, so that after shelling, the extracted kernels must be dried as in the above mentioned soaking process.

The matter of moisture content is here mentioned because it constitutes a very important factor in the treatment of the nuts for shelling as hereinafter described.

This treatment, constituting my invention, eliminates the treatment by immersion in water as heretofore practised, and consists in subjecting the nuts to heat which appears to require to be in excess of the boiling point of water preferably at temperatures varying from a minimum of two hundred and twenty (220) degrees to a maximum of about 280 degrees Fahr. a still higher temperature being usable but wholly impracticable for reasons hereinafter set forth. The heating of the nuts must be effected in the presence of sufficient moisture either in the nut, it being immaterial whether the moisture content is natural or has been artificially supplied, or the moisture must be contained in the hot fluid to which the nuts are subjected. The use of a moist heating medium, preferably steam under pressure, is preferable to a dry heating medium in that the results obtained are superior.

The heating of the nuts is continued for a period sufficient to cause the kernels thereof to very rapidly attain a high temperature at which they appear to exude moisture. This is believed to begin at a temperature sufficiently high so that if continued long enough, it will cook or scorch the kernels and may be as high as from 200 to 240 degrees Fahr. This seeming exudation of moisture from the kernels appear so far as I have been able to determine, to control the success of the treatment as, if not sufficiently heated, there appears to be no appreciable advantage resulting from the treatment.

The duration of this heating step must be short so as to prevent any appreciable change in characteristic of the kernel so far as color and flavor are concerned. In practice I have found that if steam under pressure is employed and the temperature of the steam approximates 220 degrees Fahr. the duration of the heating step must not exceed ten minutes and if the temperature of the steam is higher the time must be shortened proportionately so that at 280 degrees, more or less, the time must be reduced to about four minutes. The lower temperature and longer time are preferred because the danger of scorching and cooking and thereby spoiling expensive batches of nuts, are less, whereas at higher temperature, the blanching effect is increased.

If the nut kernels contain from about five to about ten per cent natural moisture or are moistened by immersion for a few minutes in warm water just preceding their subjection to the heat, they may be quite successfully treated in an ordinary oven at the temperatures mentioned but the time of their subjection to heat must be reduced owing to the rapid absorption of the moisture by the hot air of the oven.

After treatment in the oven, or after treatment by steam as hereinafter more particularly described, the nuts are exposed to atmosphere for at least about 24 hours, whereupon they will be found to have undergone a structural change in that the shells are so brittle that they are very easily fractured, the meats are so elastic that they yield readily to collapsing pressure applied to the shells in cracking them, and are so loosely housed in the shells that they are very easily extracted from the fragments and a very large percentage thereof are completely blanched and practically all of the remainder are almost completely or very appreciably blanched, a negligibly small percentage being unblanched at least in spots.

In its preferred form the process consists in subjecting the nuts to the action of steam under pressure at a temperature of 220 degrees Fahr., the pressure being merely incidental to the temperature and the latter being gradually acquired by continuously introducing steam into the chamber until the temperature has reached approximately the said point. The pressure and temperature are then maintained for not to exceed 5 minutes and generally somewhat less, whereupon the steam supply is shut off and an exhaust valve opened to entirely relieve the pressure. The nuts are then maintained in agitation or tumbling for a period of approximately five minutes during which they appear to lose much of the moisture absorbed during the initial stages of the introduction of the steam. They are then removed from the steam chamber and subjected to atmosphere at ordinary room temperature for a day or two before they are shelled.

By shutting off the steam and opening an exhaust to relieve all pressure and then permitting the nuts to remain for a brief period in the steam chamber, apparently causes a rapid release of moisture from the shells and appears to be of advantage but not absolutely necessary.

The nuts are introduced into a sealed container when at room temperature, and, being colder than the steam then admitted to the container, the latter will condense on the nuts until their temperature becomes high. This moisture is apparently quickly absorbed by the shells and a part thereof is subsequently rapidly extracted by relatively dry heating following the use of steam. When, thereafter, they are removed from the container, the shells are still quite moist and elastic and become brittle to the extent of being readily fractured only after exposure to atmosphere for a day or two, this being true more or less also of the nuts treated in an oven. However, in some instances, more especially where subsequent hand cracking is employed, the nuts may be cracked immediately following the steam treatment, the later step of subjecting the nuts to prolonged exposure to atmosphere being more desirable for that preparation to render the shells still more brittle for machine cracking.

After such exposure to atmosphere the nuts possess all of the desirable characteristics hereinbefore set forth, and appear to retain the same indefinitely.

While persons using the process may employ apparatus of any suitable nature that may be available, I prefer to employ apparatus such as is shown in the accompanying drawings in which:

Fig. 1 is a perspective view of a nut treating apparatus with portions thereof cut away to expose the interior arrangement.

Fig. 2 is a transverse section taken through the filling inlet, or along the line 2—2 of Fig. 1.

The apparatus thus illustrated includes a drum 1 of perforated metal fastened to a shaft 2 which extends longitudinally through a casing 3 housing the drum, the drum being sufficiently smaller in diameter than the casing so that steam pipes 4 can extend into the casing between the drum and the casing. The casing 3 has at its top an inlet 5 which is normally closed by a movable gate 6 through which the nuts can be poured into the perforated drum after sliding a movable door 7 out of the position in which this door normally closes a corresponding opening in the drum. After a suitable quantity of nuts has thus been introduced into the drum, the door 7 is slid back to the closure position in which it is shown in Fig. 1 and the gates 6 and 13 and drain valve 10 are tightly closed. Steam is then supplied to the pipes 4 from which it issues through openings spaced along these pipes, while the shaft and the drum are rotated through power applied by a belt 8 to a pulley 9 on one exposed end of the shaft. After continuing the steaming for a suitable time and under suitable conditions of temperature and pressure the steam supply valves are shut off, the valve 10 in the outlet 11 leaving from the casing is opened so as to relieve the pressure within the casing. Then the nuts desirably are left in the still rotating drum for some additional time, during which a considerable moisture appears to be extracted from the shells. The rotating of the drum is then stopped and the treated nuts are withdrawn through the gate 13 at one end of the casing after opening a correspondingly located door 14 in the adjacent end of the drum. The drum 1 is preferably provided with a plurality of inwardly extending cleats 12 for obvious purposes. The cover 6 is held in place and clamped down by means of a yoke 15 and set screw 16.

Premoistening of very dry nuts may be accomplished either by soaking them in water for a short time not exceeding an hour and preferably for only a few minutes, until they have absorbed from three to five per cent of their weight in moisture.

The subjection of the nuts to the high temperature necessary to secure results hereinbefore described, also effects a thorough sterilization thereof which should, and probably does, render them less liable to decomposition or the ravages of disease germs, etc., but this has not yet been fully or satisfactorily determined.

The nuts treated by steam, whether previously moistened or not, are appreciably different from those treated in ovens, not only with respect to the percentage of blanched kernels derived, but also in that the meats are more elastic and appear to be more easily extracted from the shell fragments. This indicates that they are looser and this appears to be further accentuated by the fact that in a larger percentage of cases the kernels rattle in the shells when the latter are held between thumb and finger and briskly shaken.

Blanched Brazil nuts in commercial quantities have never heretofore been offered on the market. There have been a scattered few in large lots but the percentage has been negligible. By my process the yield of completely blanched kernels is fully forty per cent of the total product.

While I have fixed, as clearly as possible, the temperatures and time limits etc., that I have found best adapted to produce the desired results, it will be obvious that it is quite impossible to fix these limits with absolute certainty and therefore I do not confine myself to those mentioned but wish it to be understood that any variations of or modifications from the process as described herein are included in the invention as defined in the appended claims, wherein the use of the expression "exudation of moisture" or its equivalent, will be understood to refer to the seeming (but not proven) condition of the kernel which appears to be incident to the success of the treatment and which careful scientific investigation may show to be of a different nature than I have assumed. As previously indicated, my reference herein, and in the appended claims, to cooking, scorching, decomposition, etc., I refer to that action on the kernels (not at present definitely ascertained) resulting from exposure of the nut to heat for too long a period, evidenced by the gelatinous translucency of the kernel in whole or in part.

In other words, the temperatures to be used and the time limits of their use are most clearly defined by the condition of the kernel with respect to the so-called "exudation of moisture" and the similarly so-called "cooking" or "scorching" thereof. It is quite impossible to determine all of the time and temperature conditions under which these physical changes might take place in the kernel but the range appears to be very wide and I have recited only those that I have determined with reasonable accuracy, and which in practice are producing successful results.

It appears most probable, so far as I have been able to determine, that the temperature at which the so-called exudation of moisture from the kernel occurs, is also that, at which the physical change takes place which results in the rubber-like elasticity of the kernel. There appears to be no chemical change in the kernel unless the high temperature thereof is maintained long enough to effect the scorching or cooking, but, unless there is sufficient moisture present either in the nut per se or in the heating fluid, to prevent baking, the kernel will, instead of becoming elastic, become hard and brittle. The latter condition also follows subjection of the nut to dry heat at a far lower temperature than I employ and if the lower temperature and moisture are employed, the kernel will cook or scorch without attaining characteristics of elasticity, substantial blanching, and complete freedom from the shells.

I will not herein claim the treated nut, in any of its phases, as an article because the same constitutes the subject matter of a companion application filed January 18, 1923, Serial No. 613,526.

I have not particularized in this application the final steps of my method which includes a novel process and means for cracking the shells and shelling the previously prepared nuts as herein specially set forth, inasmuch as these constitute subjects matter for my companion applications Serial Nos. 316,106 and 614,107 both filed January 22, 1923.

The use in the claims of the expression "Brazil or similar nuts" is intended to include all nuts presenting similar characteristics which will lend themselves to similar treatment with similar results.

I claim as my invention:

1. The process of preparing Brazil or similar nuts for shelling which includes subjecting the same to the combined action of moisture and a fluid at a temperature in excess of the boiling point of water for a period of time sufficient to heat the kernel while confined within the shell to a degree at which a relative reaction between the kernel and shell takes place to thereby detach the kernel from the shell to render the same easily extractible from the shell fragments upon fracturing said shell, such subjection discontinued before the kernel becomes cooked or scorched.

2. The process of preparing Brazil or similar nuts for shelling which includes subjecting the nuts, including the unbroken shells, to the action of vaporous moisture in the presence of a temperature in excess of the boiling point of water for a period of time sufficient to heat the kernel to a point adapted to effect cooking thereof if continued for a sufficient period and maintaining said temperature for a period of time sufficient to effect a change in the physical characteristics of said kernel and shell without effecting cooking of said kernel, thereby to effect detachment of the kernel from the shell for rendering the same easily extractible from the shell fragments when the shell is fractured.

3. The process of preparing Brazil or similar nuts for shelling which includes introducing the same, when at approximately atmospheric temperature, into a chamber adapted to receive and hold a moist hot fluid of a temperature exceeding the boiling point of water and subjecting the nuts to the action of said fluid for a period of time sufficient to heat the nut kernel, while housed in the uncracked shell, to a temperature at which it changes its physical characteristics without effecting scorching or cooking thereof or changing the original flavor of the same, thereby to effect detachament of the kernel from the shell for rendering the same easily extractible from the shell fragments when the shell is fractured.

4. The process of preparing Brazil or similar nuts for shelling which includes effecting a heating thereof in the presence of moisture and a temperature in excess of the boiling point of water for a period of time sufficient to heat the kernels of the nuts while confined in the unbroken shells, to a point at which they change their physical characteristics without effecting cooking or scorching thereof or a change in their original flavor, thereby to effect detachment of the kernel from the shell and rendering the latter abnormally brittle to facilitate fracture thereof and render easy the extraction of the kernel from the shell fragments after such fracture.

5. The process of preparing Brazil or similar nuts for shelling which includes subjecting nuts having a substantially predetermined moisture content to a temperature sufficiently high to effect cooking or scorching of the kernels thereof within about fifteen to twenty minutes and for a period of time adapted to heat the nut kernels while housed in the uncracked shells to a point at which and maintaining said temperature thereof for a period sufficient to render said kernels elastic and discontinuing the heating thereof before scorching or cooking of said kernels is effected, thereby to effect detachment of the kernel from the shell to render it readily extractible from fragments of the latter when fractured and adapting said kernel to yield to pressure exerted on the shell to fracture the latter without breaking said kernel.

6. The process of preparing Brazil or similar nuts for shelling which includes the step of heating the nuts in the uncracked shell in the presence of moisture to a temperature varying from a minimum of approximately 220° Fahr. to a maximum of approximately 280° Fahr. for a period varying from a maximum of about ten minutes at the minimum temperature to a maximum of about five minutes at the maximum temperature, whereby to heat the shell and kernel to a degree at which detachment of the kernel from the shell is effected and said shell is rendered abnormally brittle and easily fracturable and extraction of the kernel from shell fragments, after fracture of said shell, is rendered easy.

7. The process of preparing Brazil or similar nuts for shelling which consists in first subjecting the nuts in unbroken shells to heat of a degree adapted to effect a change in the physical characteristics of the kernels thereof in less than ten minutes, said heating being effected during at least a portion of such time interval in the presence of moisture externally of the nuts whereby to prevent drying thereof, and thereafter continuing said heating under conditions adapted to extract moisture from said nuts, the total time interval of subjection of the nuts to said temperature being terminated before scorching or cooking of the kernels thereof is effected, thereby to effect detachment of the kernels from the shell to render them easily extractible from shell fragments upon cracking said shells.

8. The process of preparing Brazil or similar nuts for shelling which consists in introducing the uncracked nuts when at room temperature, into a heating chamber and thereupon introducing into said chamber a gaseous heating fluid of a temperature in excess of the boiling point of water and maintaining contact between said fluid and said nuts until the latter have attained a shell temperature approximately equal to that of said fluid, maintaining said temperature for a period sufficient to cause the kernels of said nuts to become elastic, and thereafter subjecting said nuts, before cooking or scorching of the kernels thereof has been effected, to ordinary room temperature, said heat being applied in the presence of moisture, thereby to effect detachment of said kernels from their shells to render them easily extractible from the shell fragments after cracking said shells.

9. The process of preparing Brazil or similar nuts for shelling which consists in introducing the nuts in their uncracked shells, when at room temperature, into a sealable chamber and thereafter sealing the latter and introducing steam under pressure into the same, whereby to simultaneously moisten and heat said nuts until the shell temperature thereof approximates that of the steam, and thereupon maintaining the supply of said steam at a predetermined pressure for a period not exceeding five minutes and thereupon discontinuing the steam supply and quickly relieving the pressure and permitting the nuts to remain in said chamber for a further period not exceeding five minutes, and then withdrawing the same, thereby to effect heating of the kernels to a degree serving to change their normal physical characteristics and effect detachment thereof from the shells, without cooking or scorching said kernels, to render them easily extractible from the shell fragments resulting from thereafter fracturing said shells.

10. The method of facilitating the liberation of the meat of a Brazil or similar nut kernel from its shell comprising the subjection of the uncracked nut to the action of a moist heat at a temperature and for a period of time sufficient to substantially blanch the kernel internally of the nut shell and free said kernel substantially intact from adherence to the shell, said temperature and period being sufficient to effect a heating of the kernel to a degree to effect a change of its normal characteristics without effecting cooking thereof or a change of its normal flavor.

11. The method of blanching Brazil or similar nuts comprising the subjection of the nut in the unbroken shell to the action of heat in the presence of moisture, in degree to cause relative reaction of the nut-shell, meat and enclosing membrane sufficient to substantially detach the meat from the shell and release said membrane from the meat while in the shell, such subjection being continued until the kernel of the nut has been heated to a point to effect a change in its normal characteristics except as to flavor.

12. The method of rendering the meat of Brazil or similar nuts easily removable from their shells in a substantially blanched state, comprising subjecting the nuts in the unbroken shells to the action of heat, in the presence of moisture and in suitable proportions with respect to each other, and for a period of time sufficient to liberate the kernels internally of the shells from their natural adhesion to said shells and co-incidently substantially blanching the meat, the period of treatment being terminated when the meat has become elastic without change of flavor thereby to effect easy extractibility of the meats from the shells upon cracking the latter and adapting said meats to yield to cracking pressure on the shells without breaking said meats.

Signed at Chicago, Illinois, January 16, 1923.

GIUSEPPE M. CASTRUCCIO.